Patented Apr. 7, 1925.

1,532,814

UNITED STATES PATENT OFFICE.

GURNEY O. GUTEKUNST, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SENSITIZER AND METHOD OF MAKING SAME.

No Drawing.   Application filed October 21, 1921.   Serial No. 509,438.

*To all whom it may concern:*

Be it known that I, GURNEY O. GUTEKUNST, a citizen of the United States of America, residing at Rochester, in the county of Monroe and State of New York, have invented certain new and useful Improvements in Photographic Sensitizers and Methods of Making Same, of which the following is a full, clear, and exact specification.

This invention relates to carbocyanine dyes particularly useful for the sensitization of photographic emulsions to the red and infra-red and to the method of making the same.

I have discovered that if a 6-acetaminoquinaldine alkylhalide is treated in alcoholic solution with an alkali alcoholate in the presence of a suitable condensing agent and with or without a quinoline alkyl-halide there will be formed a compound capable of sensitizing photographic emulsions in the extreme infra-red.

The following example will serve to illustrate the invention: A mixture of 5 grams of 6-acetamino-quinaldine ethiodide and 5 grams of quinoline ethiodide dissolved in 300 cc. of boiling ethyl alcohol is treated with a mixture of 25 cc. of sodium ethylate (2 grams sodium in 100 cc. absolute ethyl alcohol) and 5 cc. of formaldehyde (40%). A blue-green color develops and green crystals separate on cooling. These are recrystallized from methyl alcohol. This carbocyanine dye sensitizes a photographic emulsion very strongly in the infra-red portion of the spectrum, the maximum effect being about 730µµ, but decreasing very gradually so that it is usefully effective for a very long range extending beyond 860µµ. There may be used 15 cc. of 10% alcoholic potash instead of 25 cc. of sodium ethylate, but the reaction is not as certain. In any event the water content of the bath during the reaction is maintained as low as practicable, and I consider this an important feature of my invention. I have found that 95% ethyl alcohol may be used instead of absolute alcohol in the reaction bath, but if the water content is materially greater than 5%, any dyes produced do not sensitize in the infrared to the extent indicated above. I, therefore, consider a 5% water content to be a critical value. If there is a very high water content, no dye whatever is yielded. Other condensing agents, such as the trihalogen methanes, particularly iodoform, may be used instead of formaldehyde.

Having thus described my invention, what I claim as new and desire to secure by Letters Patent is:

1. A carbocyanine dye effective for sensitizing photographic emulsions in the ultrared region of the spectrum and produced by the action of a strong base in an alcoholic solution with a low water content on a 6-acetamino-quinaldine alkyl-halide in the presence of a condensing agent.

2. A carbocyanine dye effective for sensitizing photographic emulsions in the ultrared region of the spectrum and produced by the action of a strong base in an alcoholic solution with a low water content on a 6-acetamino-quinaldine alkyl-halide in the presence of a condensing agent and of a quinoline alkyl-halide.

3. A carbocyanine dye effective for sensitizing photographic emulsions in the ultrared region of the spectrum and having a maximum effect at about 730µµ and produced by the action of sodium ethylate in an alcoholic solution with a low water content on 6-acetamino-quinaldine ethiodide in the presence of quinoline ethiodide and formaldehyde.

4. The process of making a carbocyanine dye by the action of a strong base in an alcoholic solution with a low water content on a 6-acetamino-quinaldine alkyl-halide in the presence of a condensing agent until a dye effective for sensitizing photographic emulsions and having a maximum effect at about 730µµ is produced.

5. The process of making a carbocyanine dye by the action of a strong base in an alcoholic solution with a low water content on a 6-acetamino-quinaldine alkyl-halide in the presence of a quinoline alkyl-halide and of a condensing agent until a dye effective for sensitizing photographic emulsions and having a maximum effect at about 730µµ is produced.

6. The process of making a carbocyanine dye by the action of an alkali-alcoholate in alcoholic solution on a 6-acetamino-quinaldine alkyl-halide in the presence of a condensing agent until a dye effective for sensitizing photographic emulsions and having a maximum effect at about 730µµ is produced.

7. The process of making a carbocyanine dye by the action of an alkali-alcoholate in alcoholic solution on a 6-acetamino-quinaldine alkyl-halide in the presence of a quinoline alkyl-halide and a condensing agent until a dye effective for sensitizing photographic emulsions and having a maximum effect at about 730µµ is produced.

8. The process of making a carbocyanine dye by treating 6-acetamino-quinaldine ethiodide with sodium ethylate in alcoholic solution with a low water content in the presence of quinoline ethiodide and formaldehyde.

Signed at Rochester, New York, this 14th day of October, 1921.

GURNEY O. GUTEKUNST.